United States Patent [19]

Campbell

[11] Patent Number: 4,631,799

[45] Date of Patent: Dec. 30, 1986

[54] COMBINED MOTORIZING AND DRILLING MACHINE

[75] Inventor: Bernard D. Campbell, Grand Rapids, Mich.

[73] Assignee: Alexander Dodds Company, Grand Rapids, Mich.

[21] Appl. No.: 668,634

[22] Filed: Nov. 5, 1984

[51] Int. Cl.[4] ........................ B23B 39/02; B23P 13/02

[52] U.S. Cl. ..................................... 29/558; 29/26 A; 144/27; 408/1 R; 408/26; 409/132

[58] Field of Search .................... 29/26 A, 558, 33 K; 409/132, 191; 408/22, 24, 25, 26, 30, 117, 118, 119, 1; 144/27, 70, 82, 83, 79

[56] References Cited

U.S. PATENT DOCUMENTS

| | | | |
|---|---|---|---|
| 3,158,186 | 11/1964 | Heathington | 144/27 |
| 3,200,862 | 8/1965 | Heathington | 408/26 |
| 4,100,661 | 7/1978 | Cheak | 29/33 K |

FOREIGN PATENT DOCUMENTS

| | | | |
|---|---|---|---|
| 101392 | 2/1984 | European Pat. Off. | 144/82 |
| 516504 | 1/1931 | Fed. Rep. of Germany | 144/27 |

*Primary Examiner*—William R. Briggs
*Attorney, Agent, or Firm*—Glenn B. Morse

[57] ABSTRACT

A work piece is mortised to receive an insert, and drilled for fastenings securing the insert in position, in a single cycle of operation facilitated by mounting the drill in an axial hole in the routing cutter. The drill is guided by the radially inner surfaces of the specially hard cutter inserts. A mechanism advances and retracts the drill with respect to the cutter, with the extension of the drill beyond the cutter taking place only when the cutter is not moving laterally in forming the mortise. The mortised depth is accurately controlled by an adjustable stop traversed by the drill, and forming an abutment limiting the insertion of the router bit into the holding collet. In addition to the plunge and horizontal movements involved in the formation of the mortise, a vertical movement to form mortise side-openings is provided by pivoting downward the frame carrying the entire movement system. Chips are cleared from the drill by spinning them off in an air blast while the drill is extended from the cutter, with the cutter being withdrawn from the work piece.

7 Claims, 25 Drawing Figures

COMBINED MOTORIZING AND DRILLING MACHINE

BACKGROUND OF THE INVENTION

A mortise is essentially a recess in a work piece, and may be provided either to receive a portion of an adjoining piece, or to provide a chamber for accommodating a fitting of any description. Recent developments in the construction of cabinets, partitions, and furniture have centered in the utilization of a particular form of clip marketed under the trademark MOD-EEZ. These clips have an inclined ramp adapted to receive the head of a projection secured to the piece being joined. Relative lateral movement between the two pieces engages the head with the underside of the ramp, and pulls the two work pieces tightly together. Some models of this clip also have a latch that locks the head in place by preventing withdrawal along the ramp. The clip is secured in place within the recess by screw-type fastenings. The present invention provides a machine for forming the recess and providing the holes to receive the screws.

Previous equipment for performing this function has separated the formation of the mortise from the drilling of the screw holes either as two totally separate operations, or as functions formed at two separate stations of operation on the machine. The use of these clips is so extensive that a few seconds here and there in performing the necessary machine operations become a significant factor in the overall cost. Even when machines are fully automated, the separation of the mortising operation from the drilling inherently involves loss of time and structural problems in the machine.

It is obvious that the formation of a mortise necessarily involves at least a plunging movement in which the rotating routing cutter is axially engaged into the work piece, combined with a lateral movement as the mortise is elongated. The clip having a latch also require a side cut-out in the mortise to provide access for a screwdriver to disengage the latch. The machine must therefor provide three directions of relatively transverse movement. This sort of requirement is commonly met in machine design by the provision of transverse guideways.

SUMMARY OF THE INVENTION

The preferred form of the machine positions a cutting spindle with freedom of movement parallel to the axis of the spindle for the "plunging" movement, and also horizontally for elongating the cut generated during the plunging. The transverse guideway system providing this freedom of movement is mounted in a frame that pivots to move the cutter vertically for machining a side opening in the mortise. The mortise is prepared to receive the mounting screws by drilling the holes with a drill mounted in an axial passage in the routing cutter bit, the cutter tip inserts forming a guide for the drill. The bit is received in a spindle collet to a depth determined by a tubular set screw traversed by the drill. The drill is extended beyond the cutter to drill the holes while lateral movement of the cutter is halted. The method aspect of the invention also includes the extension of the drill while the cutter is withdrawn from the work piece for the removal of accumulations of chips.

DESCRIPTION OF THE PREFERRED EMBODIMENT

Figure 12:
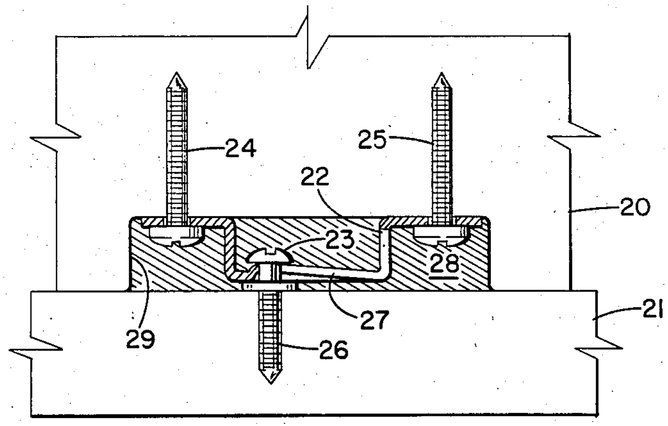
FIG. 12 is a section through a panel junction secured by a clip assembly of the type not having a latch. (Sheet 9).
Figure 13:
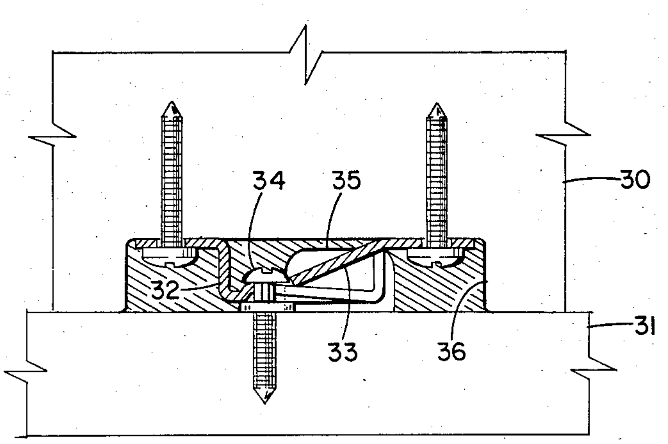
FIG. 13 is a view of a panel junction secured by a clip assembly provided with a latch. (Sheet 9).
Figure 17:
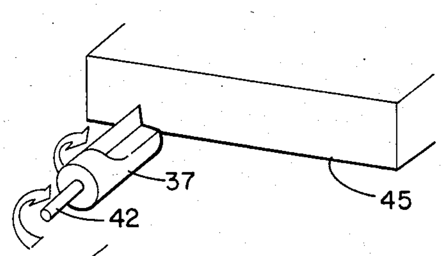
FIGS. 17 through 22 illustrate successive steps in the machining and drilling of a mortise preparatory to receiving a clip assembly. (Sheet 10).

The overall function of the machine can be visualized by reference to FIGS. 12 and 13. These differ only in the type of clip installed to join the two panels together. In FIG. 12, the panel 20 is joined at its edge to the panel 21 by the interaction of the clip 22 with the headed stud 23. The clip is secured to the panel 20 by screws as shown at 24 and 25, and the stud 23 has a screw extension shown at 26 engaging the panel 21. The sides of the slot 27 in the clip are inclined with respect to the mating end surfaces of the panels 20 and 21 to form a ramp, with the slot 27 being open at the right, as viewed in FIG. 12. The panels are first brought together in a position such that the head of the stud 23 is placed within the space 28, followed by relative lateral movement of the panels to bring the stud 23 into position on the ramp. The clip 22 is installed in the recess 29 in the panel 20, and the function of the present machine is to form this recess and drill the holes for the screws 24 and 25. In FIG. 13, the panels 30 and 31 are joined by the clip 32, which differs from the clip 22 only by the addition of the latch 33. This portion of the clip functions as a resilient leaf spring, and drops down behind the head 34 to lock the assembled condition. To dis-assemble the panel 30 from the panel 31, a screwdriver should be inserted through the side cut-out 35 in the mortise 36 so that the latch 33 can be deflected upwardly enough to permit the lateral movement between the panels necessary to slide the head 34 down the central ramp enough for disengagement. This type of assembly is standard, and forms no part of the present invention.

Figure 16:
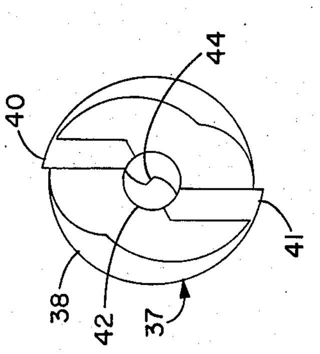
FIG. 16 is an end view of the drill and router bit assembly. (Sheet 7)
Figure 14:
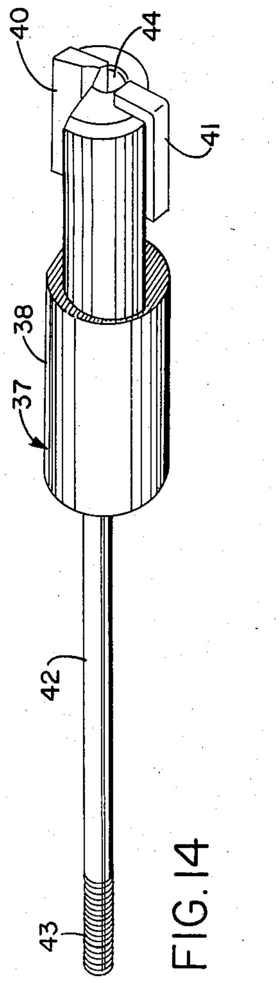
FIG. 14 is a view of the drill and router bit assembly, with the drill retracted. (Sheet 7).
Figure 15:
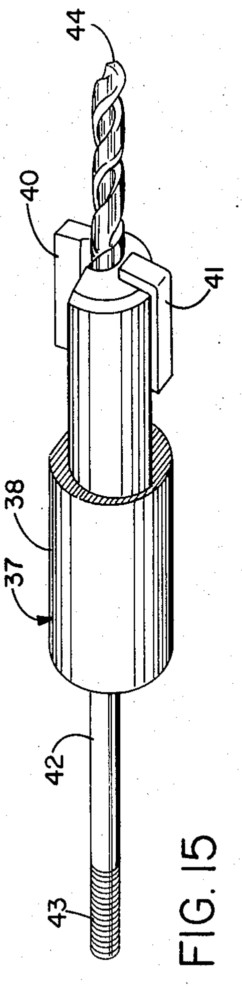
FIG. 15 is a view of the assembly shown in FIG. 14, with the drill extended from the router bit. (Sheet 7).

The sequence of operations of the machine is based upon the assembly of a drill with a routing cutter, as shown in FIGS. 14, 15, and 16. The router bit indicated generally at 37 has a shank 38, and a cutting portion extending from it which includes the carbide inserts 40 and 41 which actually perform the cutting associated with the removal of material to form the mortises 29 and 36 shown in FIGS. 12 and 13. The drill 42 is slideably received within an axial hole in the router bit 37. The shank of the drill is threaded, as indicated at 43, for interengagement with the actuating mechanism of the machine. This drill is of a standard long-shank variety, with the threading 43 added to it. In the retracted position of the drill 42 shown in FIG. 14, the tip of the drill indicated at 44 is preferably flush with the ends of the inserts 40 and 41. During the plunge cutting in which the router bit axially engages the work piece, the drill tip 44 may participate in the cutting action. The radially inner ends of the inserts 40 and 41 are ground to form a guide for the drill 42. The hardness of the cutting inserts 40 and 41 inhibits wear, which is minor because of the fact that the drill normally rotates with the routing cutter.

Figure 25:
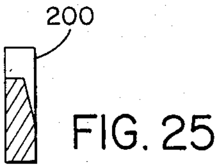
FIG. 25 is a section on the plane 25—25 of FIG. 25. (Sheet 5).
Figure 18:
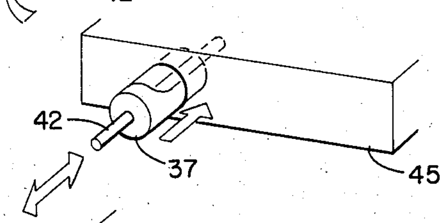
Figure 19:
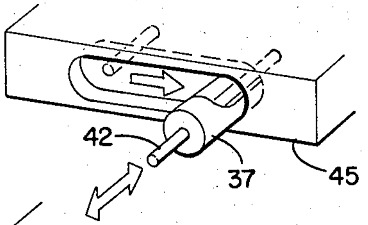
Figure 20:
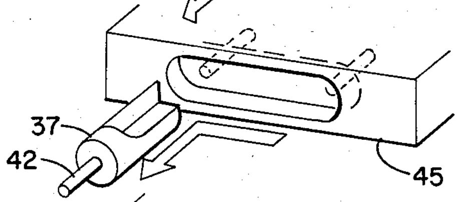
Figure 21:
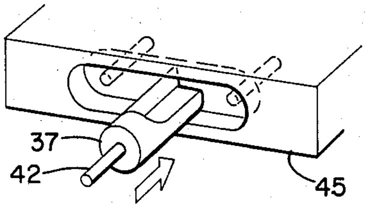
Figure 22:
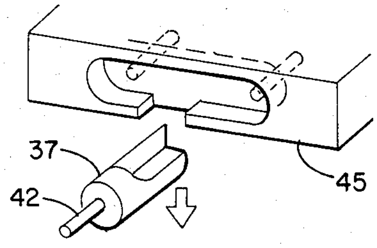

The sequence of operations in forming a mortise, and drilling it to receive mounting screws, is illustrated in FIGS. 17 through 22. In the initial condition of a cycle of operation, the work piece 45 is placed in position, which is spaced somewhat from the cutting end of the router bit 37. The drill 42 is withdrawn to the position shown in FIG. 14. The operating cycle begins with a plunge movement which interengages the cutting end of the router bit 37 with the work piece 45, as shown in FIG. 18. In this position, the drill 42 is extended to drill one of the screw holes in the base of the mortise. The drill is then quickly withdrawn, and the machine moves the routing cutter laterally to the position shown in FIG. 19 to complete the formation of the mortise. The lateral movement is halted as the drill 42 is then advanced to form the other of the two holes for receiving the mounting screws. The machine is then returned to the position shown in FIG. 20, which is the same as that of FIG. 17. The work piece 45 is then removed. Where a side opening in the mortise is desired, as shown in FIG. 13, the machine moves the routing cutter from the position of FIG. 19 to an intermediate position shown in FIG. 25, at which the routing cutter is lowered to form the side cut-out, as shown in FIG. 22.

Figure 7:
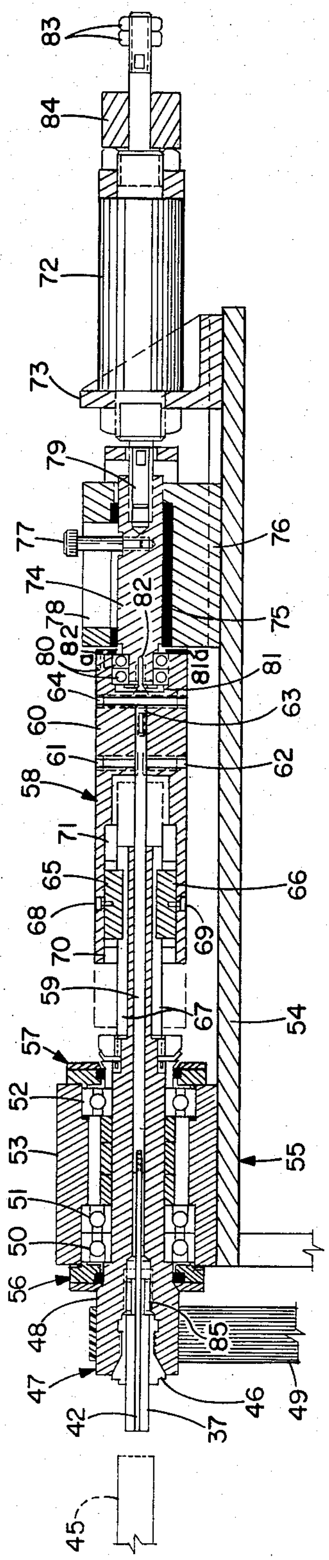
FIG. 7 is a sectional elevation of the spindle assembly. (Sheet 7).

The mechanism responsible for driving the router bit 37 and the drill 42 is best shown in FIG. 7. The bit 37 is securely clamped in a collect 46 mounted in the rotating spindle 47. The exposed cylindrical surface of the spindle indicated at 48 receives the driving belt 49, which rotates the spindle at the high speed normally associated with routing operations. The spindle is rotatably supported in the bearings 50–52 associated with the bearing block 53. This block is securely bolted to the plate 54 forming a part of the carriage frame 55 of the machine. Conventional seal assemblies as indicated at 56 and 57 protect the bearings.

The coupling assembly generally indicated at 58 has the dual function of transferring driving torque to the drill, and positioning the drill axially. The drill extension rod 59 is in threaded engagement with the drill 42, and extends throughout the axial bore in the spindle 47. The rod continues into a coaxial hole in the right end of the coupling shell 60, as viewed in FIG. 7. A pair of opposite flats on the rod 59 are engaged by the screws 61 and 62 in threaded engagement with the shell so that the shell and the rod are rotatively interlocked. An adjustment screw 63 in threaded engagement with the end of the rod 59 functions as a limit stop in conjunction with the cross-pin 64. Rotation of the shell 60 with the spindle is assured by the interengagement of the keys 65 and 66 with the keyways 67 of the spindle 47. The keys are fixed with respect to the shell by the screws 68 and 69. The coupling assembly 58 is thus able to keep the drill 42 rotatably fixed with respect to the spindle, and yet move the drill axially from the retracted to the extended position. The alignment of the shell 60 coaxially with the spindle is maintained by the bushings 70 and 71.

The air cylinder 72 functions as the actuator for moving the coupling 58. This cylinder is mounted on the bracket 73 secured to the plate 54. The actuating force is transmitted through the push rod 74 slideably carried by the bushing 75 of the guide block 76, which is also secured to the plate 54. The push rod 74 is maintained in rotatably fixed position by the screw 77, which is free to move along the slot 78 in the guide block as the piston rod 79 is moved by the cylinder 72. This rod is in threaded engagement with the push rod 74. This movement is communicated to the coupling assembly 58 through the bearings 80 held in engagement with the push rod by the cap 81 and the screw 82. The cap **81*a* and screws 82*a*secure the coupling with respect to these bearings. The coupling 58 is thus free to rotate with respect to the rotatively fixed push rod 74. The extent of this axial movement is controlled by the adjustable stop nuts 83 on the piston rod 79, which engage the abutment 84 to control the depth of penetration of the plunge movement of the routing cutter 37. For this depth to be controlled with precision, the degree of insertion of the router bit into the collet 46 must be accurately determined. This is accomplished by the presence of the tubular screw 85 in threaded engagement with the spindle 47**. The axial position of this screw is adjustable to form a stop limiting the penetration of the router bit into the spindle, and thus permitting the control of the depth of the plunge movement with great accuracy. As the router bit is sharpened, this screw can be readjusted.

Figure 6:
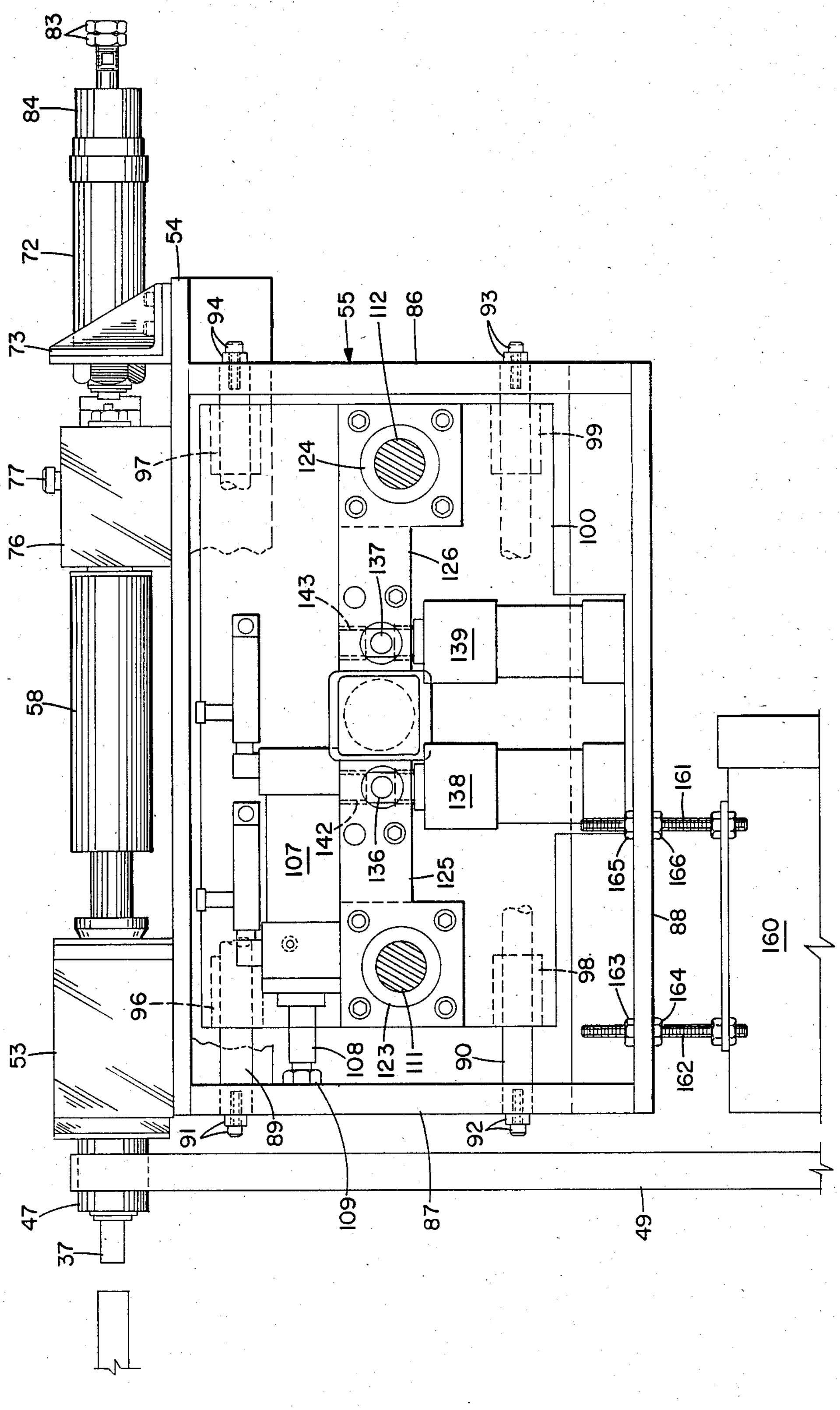
FIG. 6 is a side elevation of the central portion of the machine. (See 6).
Figure 8:
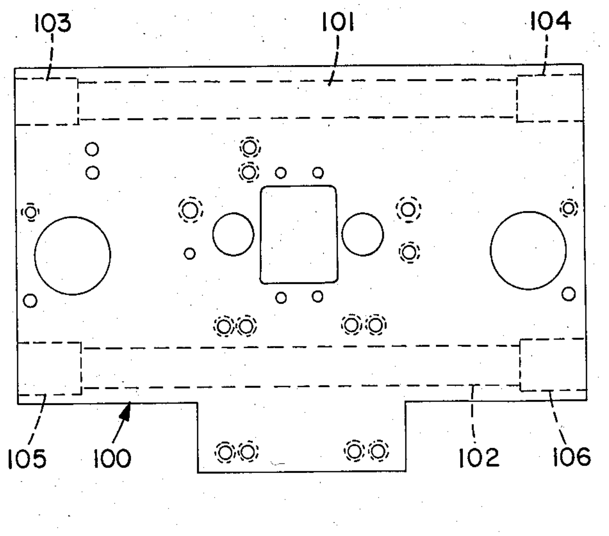
FIG. 8 is a view of the mounting plate, as seen in side elevation in the machine. (Sheet 8).

The spindle assembly described above moves with the carriage frame 55 on which it is mounted. This frame is a vertical structure including the top plate 54, the vertical plates 86 and 87, and the bottom plate 88 (refer to FIG. 6). A pair of guide rods 89 and 90 are secured to the plates 86 and 87 by screws and retainers as shown at 91–94. The rod 89 slideably engages the bushings 96 and 97, and the rod 90 engages the bushings 98 and 99, the bushings being installed on the plate 100 shown in detail in FIG. 8. The clearance holes 101 and 102 receive the rods 89 and 90, with the cylindrical recesses 103–106 provided to receive the bushings. The plunge movement of the carriage frame 55 is generated by the air cylinder 107 bolted to the plate 100, with the cylinder rod 108 in threaded engagement wih the plate 87, and secured by the lock nut 109.

Figure 9:
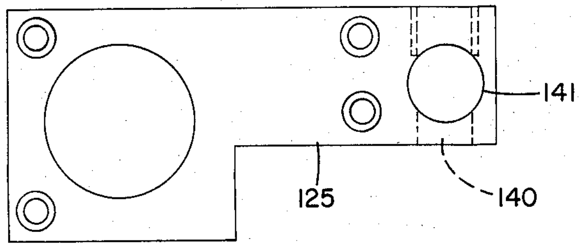
FIG. 9 is a side elevation of one of the bearing blocks. (Sheet 8).
Figure 10:
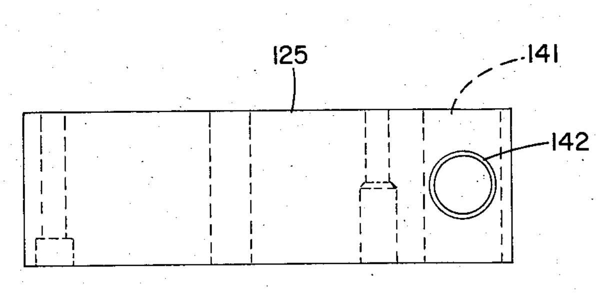
FIG. 10 is a top view of the block shown in FIG. 9. (Sheet 8).
Figure 11:
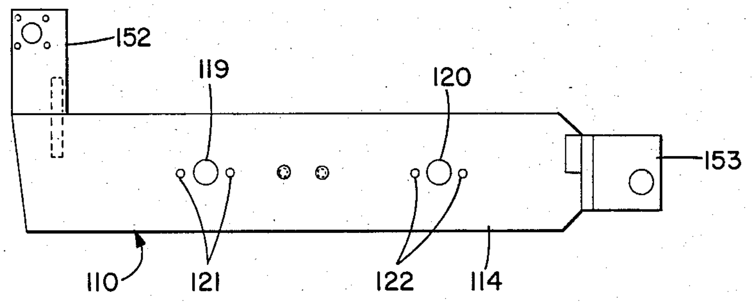
FIG. 11 is a side elevation of the pivot frame. (Sheet 9).

The slide member is mounted for horizontal movement with respect to the pivot frame 110 shown in FIG. 11. The guide rods 111 and 112 (refer to FIGS. 3 and 6) are secured at their opposite ends to the side members 113 and 114 of the pivot frame 110 by retainers and associated bolts as indicated at 115–118. Holes as shown at 119 and 120 are provided in both sides of the pivot frame 110 for receiving the ends of the rods, with threaded holes as indicated at 121 and 122 associated with them to receive the bolts securing the retainers. (Refer to FIG. 11). The guide rods 111 and 112 engage the slide member at the bushings 123 and 124 shown in FIG. 6. These bushings engage the plate 100, and also the blocks 125 and 126 appearing in FIG. 9, block 126 appearing in reverse position. These two blocks are bolted and dowelled to the plate 100 as shown. The extension blocks 127 and 128 (referring to FIG. 4) are bolted to the plate 100 on the opposite side to increase the depth of the assembly and establish a greater bearing distance along the guide rods 111 and 112. Conventional seals are installed where the guide rods 111 and 112 emerge on opposite sides of this slide member assembly.

The horizontal shifting movement is controlled by the air cylinder 129. Referring again to FIG. 4, the lower end of this cylinder is bolted to the bracket 130 secured to the plate 100. At the opposite end of the cylinder, the cylinder rod 131 is secured to the bracket 132 by the nuts 133, the bracket being mounted over a clearance opening in the side member 113 capable of receiving the end of the cylinder 129 at one extreme of the lateral shifting movement. The bracket 132 forms an arch that permits this very compact assembly. The stop bolts 134 and 135 engage the opposite portions of the assembly to provide adjustable limits to the horizontal shifting movement. Since it is also necessary to establish definite positions for the assembly to perform the side cut-outs in the mortise, where required, a second set of stop bolts is provided as shown at 136 and 137. These bolts are engageable with the retractable cylinder rods associated with the air cylinders 138 and 139 shown in FIG. 6. These cylinders are mounted on the plate 100 and are capable of extending their rods through the holes 140 in the blocks 125 and 126 into the passage provided by the hole 141. The rods are projected across this passage, and are received in the bushings 142 and 143 which stabilize the projected ends of the rods. In this stabilized position, the bolts 136 and 137 will engage the rods to form a limit stop whenever the rods are projected.

Figure 2:
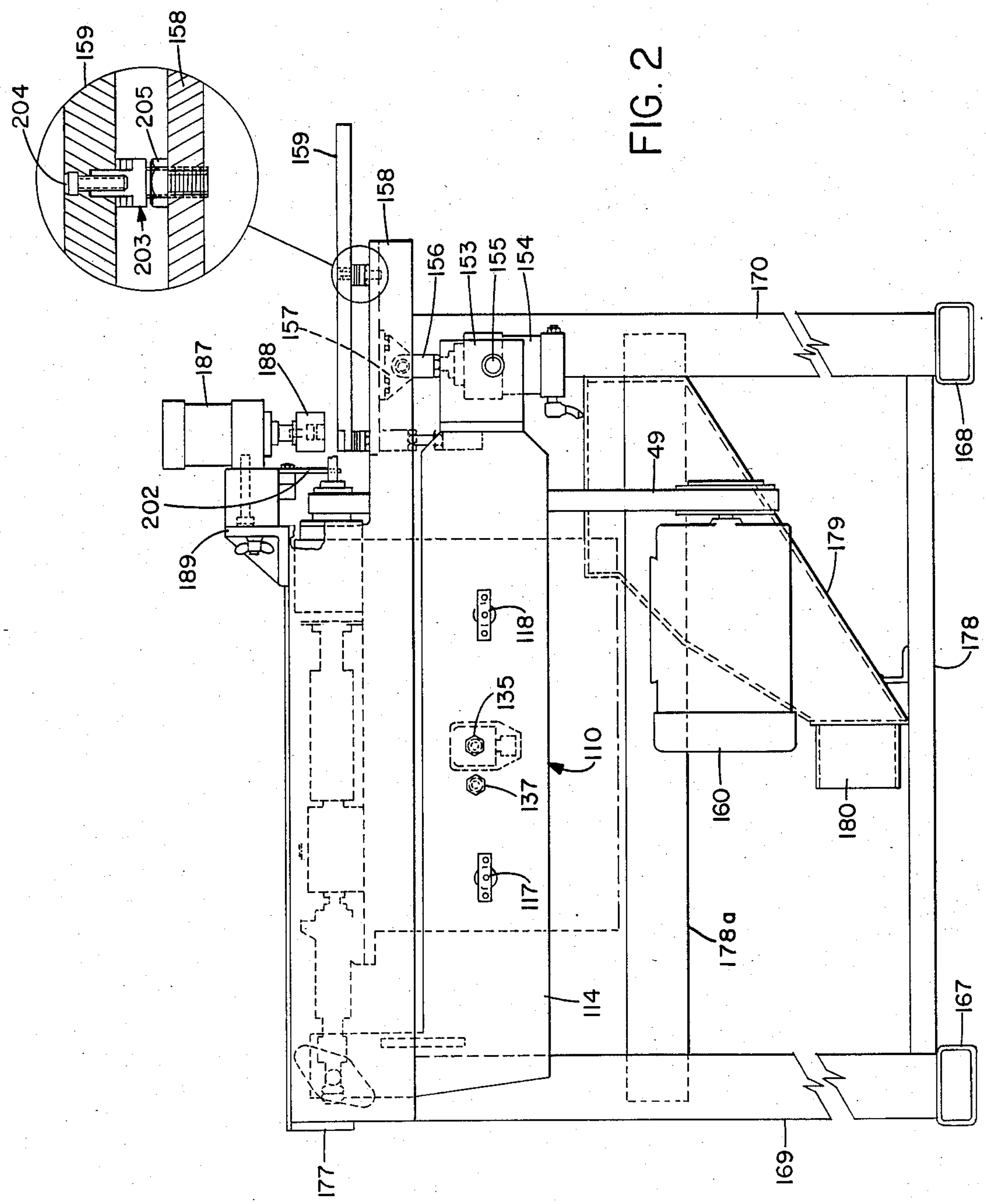
FIG. 2 is a side view of the machine without the outer housing. (Sheet 2).
Figure 3:
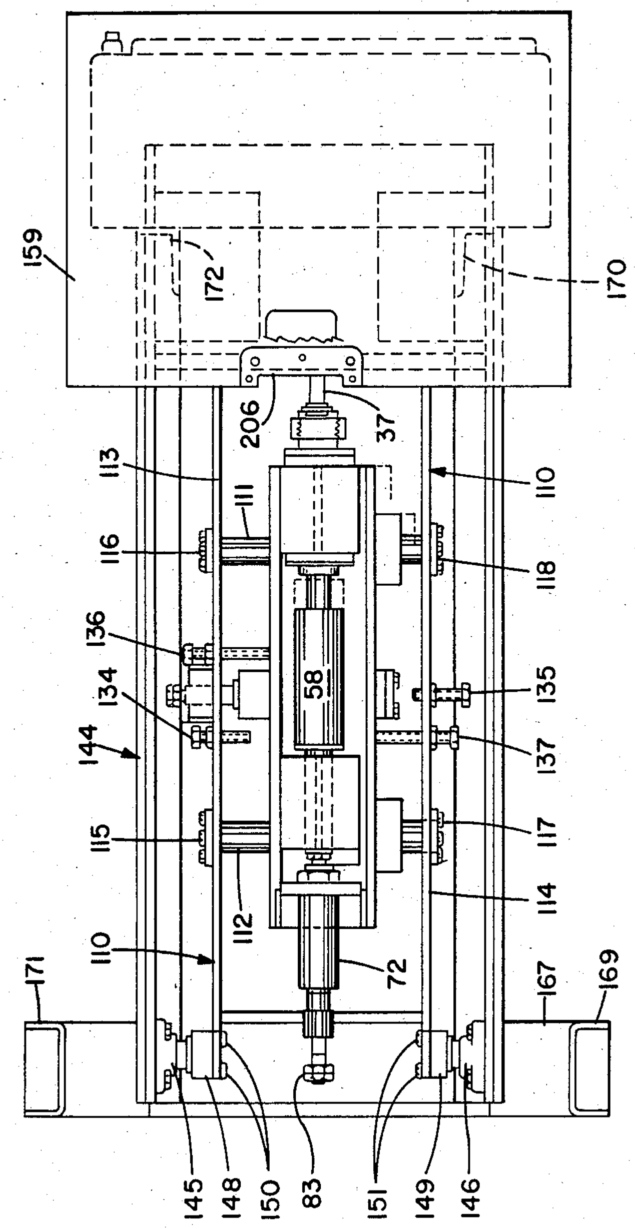
FIG. 3 is a top view of the machine without the outer housing. (Sheet 3).
Figure 4:
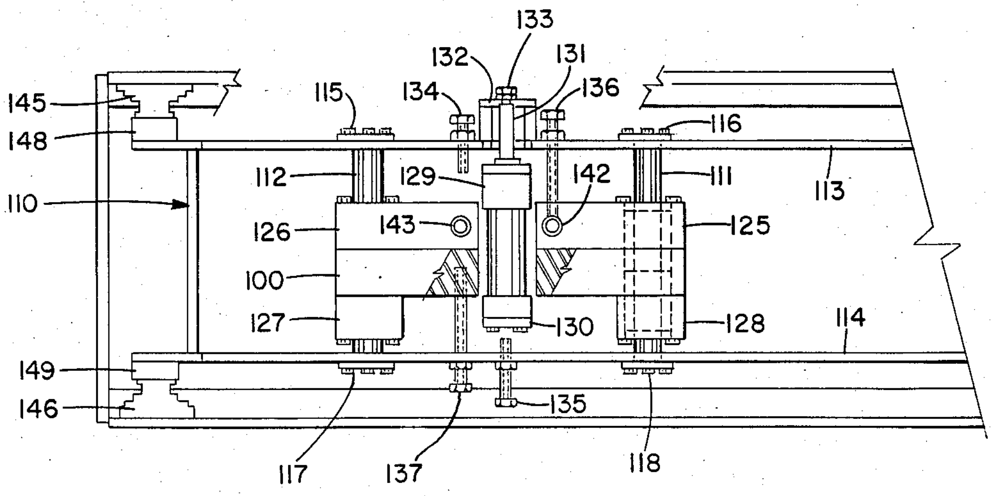
FIG. 4 is a top view, partially in section, of the central portion of the machine (Sheet 4).

The freedom of vertical movement, necessary to perform the side cut-out in the mortise, is provided by the pivotal connection of the frame 110 to the base frame 144 of the machine at the bearings 145 and 146 best shown in FIG. 3. The journal blocks 148 and 149 are bolted to the side members 113 and 114 of the pivot frame as shown at 150 and 151. Upward extensions as shown at 152 in FIG. 11 are provided on the frame sides 113 and 114 to receive these journal blocks. At the opposite end of the frame, the bracket 153 is pivotally connected to the air cylinder 154 at the pin 155. (Refer to FIG. 2). The end-fitting 156 secured to the rod of the cylinder 154 is pinned at 157 to the portion of the frame indicated at 158 supporting the table 159. Extension of the rod associated with the cylinder 154 will thus cause a lowering of the right end of the pivot frame, as viewed in FIG. 2, causing a corresponding movement of the entire guide way system, carriage frame, and consequently of the router bit. During all this range of movement, the motor 160 remains in fixed position with respect to the spindle assembly, as a result of being suspended on adjustable bolts as shown at 161 and 162 in FIG. 6 from the lower member 88 of the carriage frame. The tension on the belt 49 can be adjusted by appropriate setting of the nuts 163–166. There will normally be four of these bolts, with corresponding lock nuts associated with them.

Figure 1:
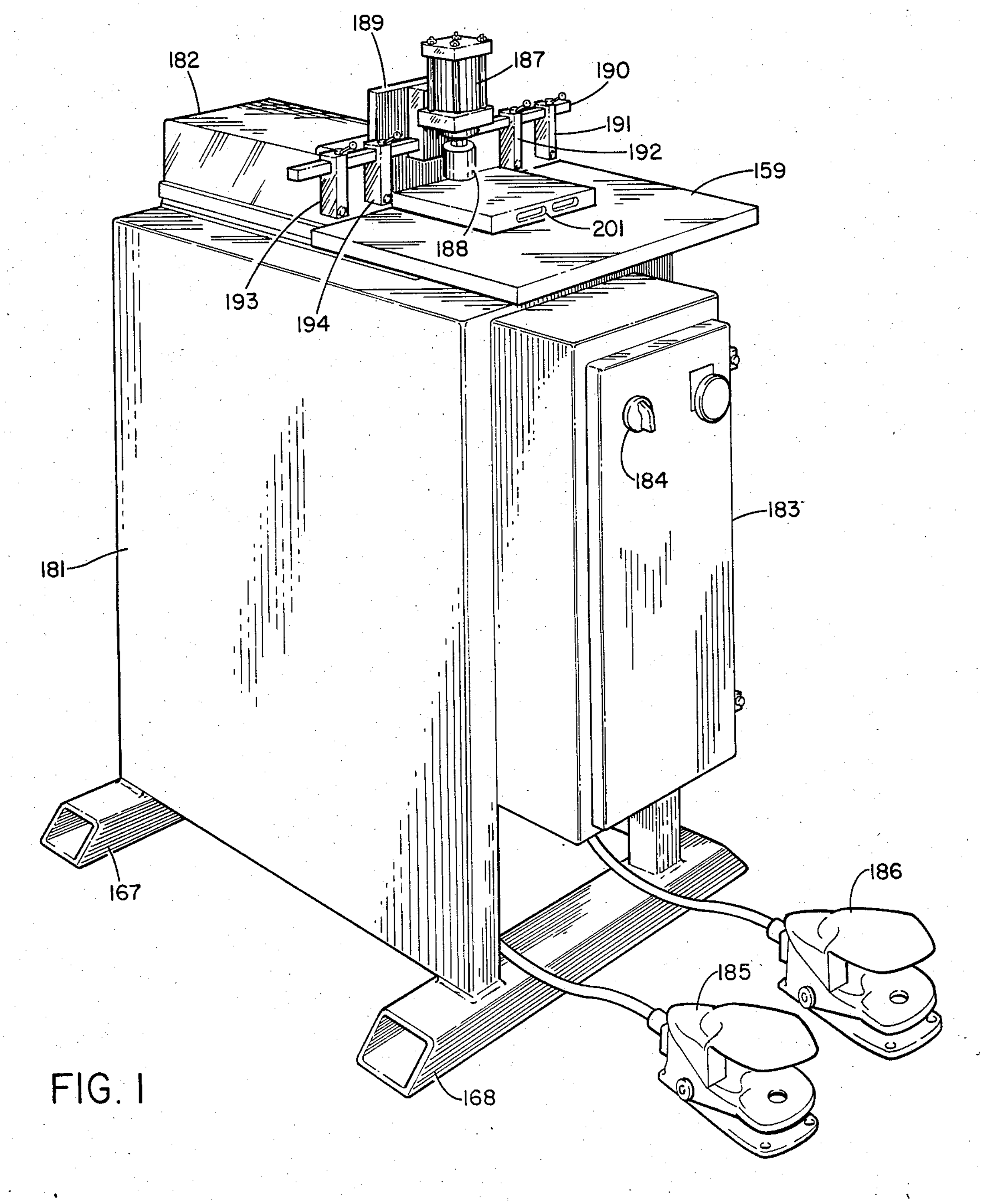
FIG. 1 is a perspective of the exterior of the machine. (Sheet 1).
Figure 23:
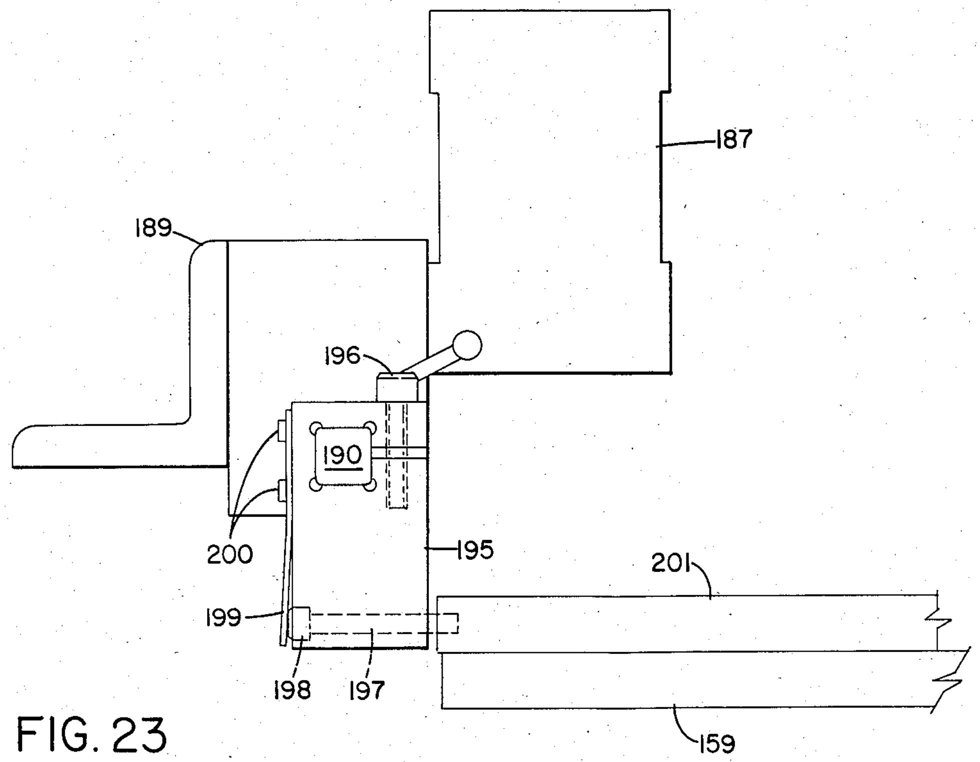
FIG. 23 is a side view of the end stop assembly of the machine, on an enlarged scale. (Sheet 4).
Figure 5:
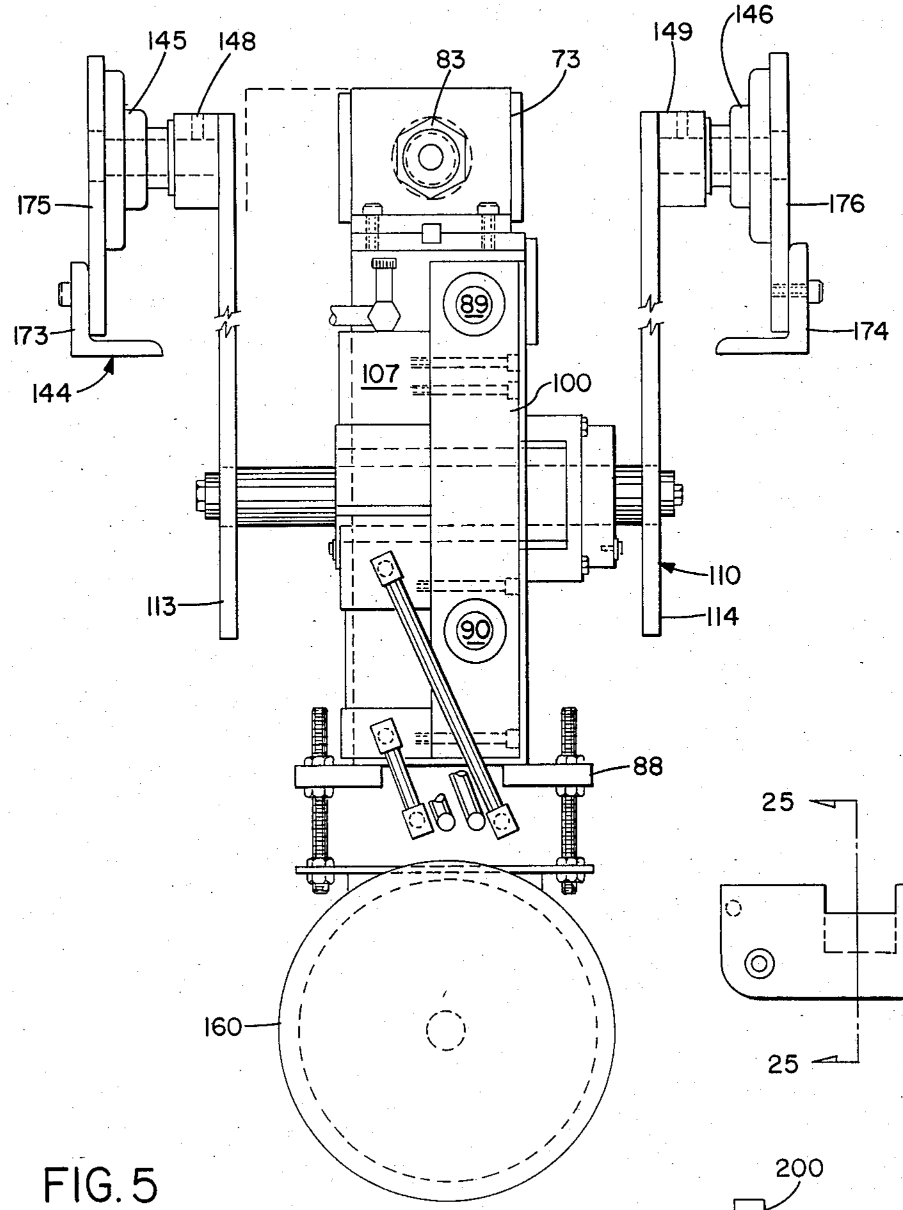
FIG. 5 is a back view of the machine (Sheet 5).

The main frame of the machine includes the base members 167 and 168 (refer to FIG. 2), the vertical members 169–172, the horizontal 173 and 174 (refer to FIG. 5), the side extension plates 175 and 176, the upper rear horizontal 177, as well as the structure 158 previously referred to supporting the table. Lower beams as shown at 178 interconnect the base members 167 and 168, and form a support for the dust collector 179. Intermediate horizontals as shown at **178*a* may also be used. The dust collector is connected at 180 to a suitable ducting system (not shown). Referring to FIG. 1, an outer housing 181 surrounds the lower portion of the machine, and a small cover 182 is readily removable to provide access to the interior. A box structure 183 contains the electronic components of the machine, and preferably provides an exterior selector knob as shown at 184 which sets the machine for a particular configuration of mortise and side cut-out. Foot pedal controls as shown at 185 and 186 are also convenient for initiating and controlling the cycles of operation and clamping of the work piece. The clamping action is provided by the air cylinder 187 controlling the pressure foot 188. The cylinder 187 is mounted on the bracket 189 secured to the main frame of the machine. A cross bar 190 is also supported by this bracket structure, and in turn supports the retractable stop assemblies 191–194. The details of these are shown in FIG. 23. Each of these includes a block 195 with a generally square cut-out to receive the bar 190, the corners being relieved so that the opening can be constricted about the bar by tightening the screw 196. At the lower end of the blocks 195, a horizontal hole is provided for receiving the pins 197 in free sliding relationship. These holes are suitably counterbored to receive the heads 198 of these pins, which are pressed to the right, as shown in FIG. 23, by the leaf springs 199 secured to the block 195 by screws as shown at 200. The pins 197 form limit stops to the lateral movement of the work pieces 201 across the surface of the table 159. If a particular inner stop is not desired, it can be simply depressed by pressing the edge of the work piece 201 against it so that the position will be controlled by the next stop beyond. A fence as indicated at 202 in FIG. 2 is provided to establish the position of the work piece prior to the clamping action. The vertical alignment of the table with respect to the machine is adjustable by the support structure shown in the enlarged section of FIG. 2. The upper portion of the adjustable mount assembly indicated at 203 is secured to the table 159 by the screw 204, with the lower section of the unit in threaded engagement with the frame structure 158, and secured with the lock nut 205**.

Figure 24:
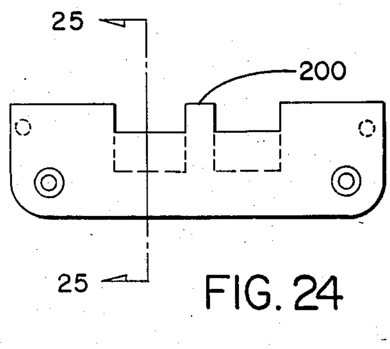
FIG. 24 is a plan view of a table insert adjacent the cutting machine of the machine, on an enlarged scale. (Sheet 5).

The table 159 preferably includes a recess for receiving a chip-breaker insert as indicated at 206 in FIG. 3. These are installed so that the top surface is flush with the surface of the table 159, and the configuration of these inserts will vary with the particular type of cut-out being machined. Where a lateral cut-out in the mortise is required, a chip-breaker insert of the type illustrated in FIGS. 24 and 25 will be used. It is obviously necessary that the correct configuration of chip-breaker should be selected for the position at which the rotating router bit is to move downward to form the side cut-out. If the wrong configuration of chip-breaker is used, damage is certain to result, along with a considerable safety risk. With this in mind, it is preferable to incorporate switch actuators (not shown) on the underside of the table that will detect the presence of various portions of a chip-breaker. This detection signal is then used by the electronic system to determine whether the chip-breaker corresponds to the particular mortise configuration that has been selected by the controls.

The electronic system housed in the box 183 includes conventional electronic cpomponents interconnected according to standard principles of circuitry to control the various valves (not shown) associated with the air cylinders previously described to establish the cycle of operations. This can be accomplished in a variety of ways utilizing well known techniques.

I claim:

1. A mortising and drilling machine having a main frame, a work-receiving table mounted on said main frame, routing means moveably mounted with respect to said main frame for axial movement with respect to work pieces received on said table, and for lateral movement in a direction normal to said axial movement, positioning means adapted to induce said axial and lateral movements, and control means adapted to coordinate said movements, wherein the improvement comprises:

a rotary routing cutter carried by said routing means, said routing cutter having an axial hole throughout its length, said routing means including a spindle rotatably mounted with respect to said frame, said spindle including clamping means for gripping said routing cutter, said spindle having an axial threaded recess inward from said clamping means, and further including a tubular setscrew in threaded engagement with said recess to form an adjustable stop for determining the axial position of said cutter with respect to said spindle;

a drill slideably received in said hole, said drill being axially moveable within said setscrew:

rotary drive means for said drill; and means for inducing relative axial movement between said drill and said routing cutter.

2. A machine as defined in claim 1, wherein said routing cutter is provided with tip inserts of specially hard material, and the radially inner extremeties of said inserts are formed to provide guiding surfaces for said drill.

3. A machine as defined in claim 1, wherein said positioning means includes a carriage frame, an intermediate slide member, a pivot frame, first guideway means interconnecting said carriage frame and said slide member, second guideway means, disposed transversely to said first guideway means and interconnecting said slide member and pivot frame, and pivot means disposed on a horizontal axis providing a freedom of vertical movement of said routing means, said pivot means interconnecting said pivot frame and said main frame.

4. A machine as defined in claim 3, additionally including stop means disposed to limit movement of said slide member along said second guideway means, and retractable abutment means mounted on said slide member and moveable to and from a position engageable with said stop means to establish an intermediate lateral position of said routing means.

5. A method of machining a mortise in a work piece to receive a member to be secured with fastenings, comprising:

axially advancing a rotary routing cutter into said work piece;

moving said cutter laterally to complete the formation of said mortise; and extending a drill through an axial hole in said cutter during at least one period in which lateral movement of said cutter is halted.

6. A method as claimed in claim 5, additionally including extending said drill from said cutter while said cutter is axially withdrawn from said work piece and while said drill is rotating.

7. A method as defined in claim 6, additionally including the directing of a blast of air on said extended drill.

* * * * *